United States Patent Office 3,093,458
Patented June 11, 1963

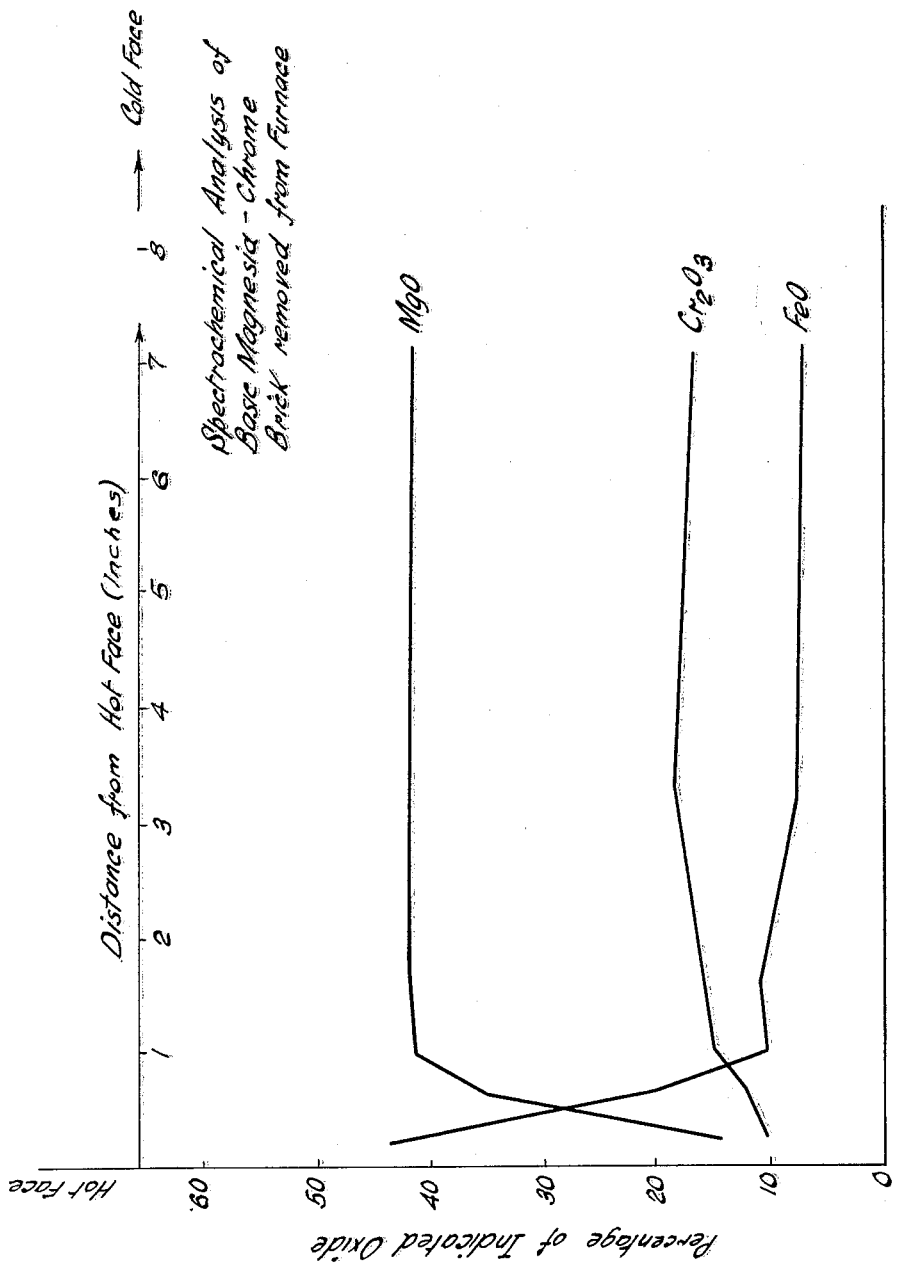

3,093,458
METHOD OF SPRAYING MULTIPLE COATINGS OF REFRACTORY COMPOSITIONS FOR HOT FURNACE REPAIR
Raymond J. Demaison, Bronx, N.Y., assignor to Quigley Company, Inc., a corporation of New York
Filed Jan. 17, 1961, Ser. No. 83,272
6 Claims. (Cl. 25—155.5)

This invention is directed to multiple coatings of refractory compositions for use in the maintenance of certain types of industrial furnaces which operate at high temperatures. The normal types of refractory walls and roofs upon which the instant compositions can be applied are constructed of silica, chrome, chrome magnesia, magnesia chrome, or magnesia bricks or panels and are extensively used in the steel industry. In the art today silica bricks are known as acid refractories and chrome bricks are known as neutral refractories while the chrome magnesia, magnesia chrome and magnesia bricks are commonly known as basic refractories.

The normal destruction of the faces of the acid, neutral and basic refractories in the steel furnaces is caused mainly by the reaction of the compositions in the brick with the iron oxides and slags deposited on their faces during the normal operation of the furnaces. There is also another factor which causes destruction of the refractories in steel encased basic units and that is the composition of the brick reacts with the steel that is used to encase, strengthen or support the bricks in the furnace roof under the high heats encountered in normal furnace operation. Therefore the exposure of the chemically bonded bricks with the steel casings, reinforcings or plate supports will result in the first firing to produce the desired ceramic bond and then the subjection of the refractory composition to the heat of the furnace will cause the refractory composition to react further with the steel and produce additional changes. This is also true with the iron, iron oxides and slags deposited on the faces of basic bricks, resulting in an attack from both the inside and outside. In most instances, furnaces using acid bricks are of such design as to eliminate the steel for support and retention of the units in the roof arch.

Still another problem which must be faced arises when chemically bonded basic refractories are initially installed in the furnace at the start of a campaign and then fired in place in the roof or wall to thus develop the ceramic bond. In such instances, it can be readily understood that the bond that is developed in the refractory is not going to be even but will be greater in the flame exposed face area (due to the higher firing temperature it is subjected to) and will taper off toward the outer face.

The problem at present has been greatly magnified by the use of oxygen lances and free oxygen in the burners in the open hearth furnaces in order to obtain increased steel production and still use the available equipment. In some instances recourse has been made to basic bricks in which the magnesia content has risen to 65% and even as high as 80%, although in other instances the chrome ore content is kept above the magnesia content. In silica bricks, the problem is of a different nature as the brick becomes unstable above their limited temperature of approximately 3000° F. In all cases, the main problem encountered is to keep the volume stable and within safe limits and still have high spalling resistance and high resistance to mechanical breakage.

Heat sizes have increased tremendously, higher firing rates are being used and additional servicing equipment has been furnished and methodically used in order to minimize delays and improve furnace efficiency. In changing over to the use of oxygen in the normal open hearth furnace, the normal speeds of reaction and production have been changed sharply upwards to result in a rapid change in the rates of reactions due to the introduction of oxygen, with a resultant increase of tonnage per hour produced from such a unit and thereby cause a more rapid deterioration of the refractory linings employed therein. The normal improvement that may be expected from the use of oxygen is a decrease of from 10 to 25% in heat time and an overall saving in fuel of from 18 to 35%. Due to the speeding up of the rates of reactions in the furnaces, the temperatures created therein must be more closely watched and controlled in order to insure against damage to the furnace lining with a subsequent loss of time and production for necessary repairs.

One of the items that has been a boon to the use of oxygen in the furnaces with the resultant high variations in temperatures has been the development of a higher magnesia content brick and the further discovery, development and use of a furnace repair technique which is carried out under a rigid schedule to spray suitable refractory compositions in slurry form upon the walls and roofs of the furnaces during normal operation when they become deteriorated to a certain point and thus restore them to their normal usefulness for a longer period of time. It is thus possible by the use of suitable coatings applied on a definite schedule to retard the deterioration of the original refractory linings to a point where more than double the number of heats may be obtained in a normal campaign and thus bring down the refractory cost per furnace per ton of steel produced to a very low figure.

In conducting research in accordance with the above method of repairing the refractory linings, it was conceived to further improve their life span by applying not only refractory coatings of the same composition but in addition refractory coatings of different compositions, each of the different coatings to be applied one over the other, and to be so compounded as to be more resistant to rapid thermal shocks, erosion and chemical attack of iron and slag. The coatings must be compatible with the parent refractory lining composition and with each other to result in a multiple coating which will stand up for a longer period of time to thus reduce repair intervals. The coatings can still be applied on a schedule but as stated above the intervals between applications may be greater and thus make furnace operation simpler and more economical.

The changes that normally take place on the face of the refractory lining under the influence of the heat of the furnace to thus change the composition of said lining are mainly affected by the following variables which are presented herein in their order of importance as to effect.

(1) The initial composition of the refractory lining and whether it is chemically bonded or ceramically bonded prior to installation.

(2) The amount of iron that is used for reinforcing, containing and supporting the structure and the position thereof in the roof or walls per unit of furnace area.

(3) The iron oxide deposited as a layer on the face of the refractory lining.

(4) The slag deposited as a layer on the face of the refractory lining.

(5) The deposition of iron splashes on the face of the refractory lining due to splashing or foaming when oxygen is employed in lances.

(6) The deposition of iron and lime on the face of the refractory lining due to splashing when loading.

It can readily be seen that under the influence of the above variables a chain reaction will be caused to occur within and on the surface of the refractory lining under the influence of the heat of the furnace and change the composition of the lining and thus cause fusing, spalling and peeling due to temperature variations normally encountered in furnace operation. A very serious defect in the refractory linings now employed, therefore, is their inability to remain in a stable state and not react with the iron, iron oxide and slag formed on their faces continually during normal furnace operation.

In the accompanying drawing, there is shown a spectrochemical analysis of a sample of a typical basic brick containing 40% magnesite that was removed from an open hearth furnace roof when the furnace was down for repair. The hot face to the left is where all the actual reduction of refractory oxides with the iron, iron oxide and slags take place under the influence of furnace operation and it is within this area that the deposits on the face cause maximum changes; therefore, this face is the face that is coated in order to control and reduce the build-up of slag, iron and iron oxide. It will be noted that the MgO is practically constant through the whole brick with the exception of approximately 1″ on the face where its percentage immediately proceeds to drop sharply. The same is not true of the $Cr_2O_3$ which begins to drop slightly from approximately 3″ to 1″ from the hot face, at which point it drops more. The FeO continues constant to a point approximately 3″ from the hot face and there continues to rise slightly to a point 1″ from the hot face and then rises sharply, indicating the absorption and reaction of the iron and iron oxide in or on the refractory unit during normal operation with the refractory composition of the unit. The inferences that can be drawn from these curves are as follows:

(1) The MgO reacts with the iron, iron oxide and slag deposited on the face of the refractory units to form ferro magnesites.

(2) The $Cr_2O_3$ reacts with the iron, iron oxide and slag deposited on the face of the refractory units to form chrome iron spinels.

(3) The FeO in the brick combines or reacts with the iron, iron oxide deposited on the face of the refractory units and results in large quantities of FeO, $Fe_2O_3$ and $Fe_3O_4$ to combine with the magnesia and chrome as cited above. The excessive iron or iron oxides will then be available to further react with the brick and thus cause deterioration.

(4) Most of the reactions on the faces of the refractory units take place at an accelerated rate in the first inch of said units due to elevated temperatures.

It is with this background in mind that the instant invention was conceived to improve and protect the face of the refractory lining to thus result in a much longer life, and the invention is actually predicated on the ability of the parent refractory furnace linings to react with coatings placed on their surfaces either in single layers or in multiple layers to thus form thereon a built-up protective coating of variable thicknesses and compositions as desired. A further object of the invention is to provide coatings which in themselves, once they are placed on the refractory lining, will be further able to carry on and react within themselves and with the subsequent deposits of iron oxide and slag which will be deposited thereon in normal furnace operation and thus further protect the parent refractory lining. There is another result which will be attained in the use of the instant invention and it is one that is of extreme importance as it will also tend to lengthen the life of the parent refractory lining itself by providing on the face of said parent refractory lining a coating which will take and absorb the thermal shocks and prevent them from being passed directly on and into the parent lining but will in essence act as a buffer zone.

In the normal furnace operation using oxygen in lances, the major physical furnace characteristics (without taking into consideration the metallurgy involved) and the operating conditions which effect the composition and quantity of the iron, iron oxide and slag deposits on the face of the refractory lining are as follows:

(1) The width of the furnace.

(2) The length of a furnace.

(3) The size and depth of the pool of molten metal.

(4) The entrance angle of the burner.

(5) The fuel to air ratio employed in the burner.

(6) The fuel used and rate and its characteristics.

(7) The introduction of oxygen into the burner air.

(8) The use of oxygen lances (the lance design, locations in the furnace and the volume and period of blow).

(9) The use of the oxygen lances for the insertion of fuels or solids (volumes and periods of blows).

(10) The distance between the roof line and the bed.

(11) The composition of the refractory lining and the type and location of the iron reinforcement and encasement.

(12) The quantity of lime used and how loaded.

(13) The shape the scrap is in and hot metal additions and timing thereof.

It can readily be seen therefore with all the above variables in operating conditions affecting the refractory lining, it is only natural that their effect will be noted with fusing, spalling and peeling and even in some instances failure under load. One of the main causes of refractory lining failure in the past has been the spalling that often occurs due to thermal shock and in addition it must be remembered that this cause is extremely prevalent where rapid and in some instances violent reactions are taking place as in the use of oxygen in the furnace. Another cause is the formation of heavy deposits of iron, iron oxide and slag with heavy penetration into the lining and thus cause deterioration by fusion and peeling.

The prime purpose of this invention is to institute a regular repair schedule and thus control and preclude damage and failure of the refractory linings in the furnaces and where it has already occurred repair the eroded or spalled areas and thus prevent further damage without the necessity of lowering the temperature of the furnace or interrupting production. It is therefore self evident that the furnace would only have to be shut down when the refractory lining has deteriorated to such an extent as to make it uneconomical to repair due to the high volume of repair materials which would be necessary or to clean out the slag pockets or other portions of the furnace.

It is therefore proposed to spray the instant compositions either successively or subsequently upon the flame exposed hot surface of the refractory lining of the furnace roof and walls while the furnace is in operation and which will react as follows:

(1) The instant compositions are in the form of plastic slurries and thus when sprayed upon the hot refractory linings the plastic slurries will make intimate contact with said refractory linings and with each other when used for successive coatings and thus hold the plastic slurries in place.

(2) As the moisture contained in the plastic slurries is evaporated by the latent heat contained in the refractory lining and the heat of the interior of the furnace, the binding agents contained in the instant compositions take over and hold the slurries on the surface of the refractory lining and, in the case of multiple coatings, on to each other until the temperature rises to such a point as to activate some of the ingredients and thereby cause reactions to take place with the existing parent refractory material and with each other to thus form an integrated or monolithic refractory material coating on said parent refractory lining. The subsequent reactions that take place on the surface of the parent refractory lining can therefore cause the formation of refractory compounds which are of a higher refractory nature than the actual ingredients of the parent refractory lining and, in addition, provide a coating which has a greater capacity to absorb iron oxide than is possible with the parent refractory lining.

The prime purpose of the instant invention is to therefore provide a method of coating acid, neutral or basic refractory linings of high temperature furnaces with a suitable plurality of coatings, each succeeding coating containing an increasing amount of magnesite to thus prolong the life of the coating by being constantly available to form additional spinels with the iron oxide as it is deposited thereon in the normal operation of the furnace. In practicing the invention, it will therefore be necessary to apply a first or prime coating on the parent refractory lining of a composition in plastic slurry form that will be compatible with the composition of the parent refractory lining and then apply over this prime coat a series of coatings containing increasing amounts of magnesites to thus provide greater chemical resistance and refractoriness and in addition provide an excess of the magnesite in order to carry on the absorption of the iron oxide deposited thereon.

It is proposed to provide a series of compositions that will be available for use with each of the following types of brick:

(1) Silica (acid)
(2) Chrome (neutral)
(3) Chrome magnesia (basic)
(4) Magnesia chrome (basic)
(5) Magnesia (basic)

The above bricks may be of the standard type used in the steel industry today and are manufactured and sold under various trade names and numbers. In order to apply the proper coating for a prime coat for each of the types stipulated above, it will simply be necessary to know the ingredients of the brick and then provide a coating that is composed of approximately the same raw or compatible materials in suitable fine grain form and adding suitable binder, dispersing and suspension agents to allow the preparation of a plastic slurry which can be sprayed on the surface of the refractory lining. It will be possible therefore to use one of the above stipulated types of coatings as the first or prime coating and thereafter for the subsequent coatings to simply add magnesite in an increasing amount for each subsequent coating to thus end up with a series of coatings which will be compatible with each other and which will also be compatible with the compositions contained in the parent refractory.

The coatings which may be used most in the first instance, as stated before, must have the proper grain size and the additions of suitable binder, dispersing and suspension agents to insure their retention on the surface of the parent refractory lining. It is also necessary in the preparation of the slurries for spraying to insure a thorough and intimate mixing of the ingredients and in addition under certain circumstances it may be necessary to heat the mixtures to at least 90° F. minimum to 140° F. maximum in order to insure a thorough dilution.

Let us now take a hypothetical case merely to insure a thorough understanding of the disclosures being made herein. Assume the parent refractory lining to be of the chrome-magnesia (basic) type in which the brick composition will be in the realms of a predominantly chrome ore section of the table. Prepare a suitable slurry of the chrome ore and magnesite in approximately the same ratios as was used in the making of the refractory lining and add thereto suitable additions of binder, dispersing and suspension agents to produce a suitable composition which, when applied in slurry form onto the hot face of said refractory lining, will react with the iron, iron oxides and slags on the face of the parent refractory lining to form a coating compatible with the lining and which will therefore protect said lining. After this initial or prime coat is applied, put on one or more coatings which will have decreasing amounts of chrome ore and increasing amounts of magnesite to further protect the parent refractory lining and in addition react with the subsequent deposits of iron oxide and slag formed thereon during normal steel production to produce chrome spinels and ferro-magnesia spinels which are of very good refractoriness. This action in itself precludes the further reduction of the parent refractory contained behind the applied coatings by insuring absorption of the iron oxides in the coating on the surface of the refractory lining without disturbing or causing a further reduction of the composition in said refractory lining.

The same situation can be set up for any one of the refractory compositions cited in the table and it is possible to go from the acid to the neutral and to the basic end of the spectrum without any difficulty and thus insure the protection of the parent linings. The real criterion of the situation is the resultant crystalline structure which is formed on the face of the parent refractory lining in the form of chrome spinels ($Cr_2O_3$—$FeO$) and ferro magnesia spinels ($MgO$—$Fe_2O_3$) resulting from the reactions which take place on the surface of the parent refractory lining when the composition in slurry form sprayed thereon reacts with the iron, iron oxides and slag on the face and the iron oxides contained in the parent refractory lining. In addition the presence of an excess of chrome or magnesia in the sprayed compositions furnishes a further source of refractory oxides with which subsequent deposits of iron, iron oxide and slag may react as they form on the face thereof and form spinels. The number of subsequent coatings which may be placed on the face of the parent refractory lining and the amount of free magnesite which will be available for further action with the iron, iron oxide and slag will therefore be a measure of the frequency of the program which can be instituted and set up to protect and preserve the parent refractory lining for a definite period of time. It is supposed that the structure provided on the face of the parent refractory is comprised of chrome and magnesia oxide crystals having a substantial portion of their surfaces free from impurities and which therefore allow the subsequent iron, iron oxide and slag deposits free access to these crystals to allow the continuous reaction to take place in the coating until all of the excess spinels have been consumed and thereby necessitate a further series of coatings to further protect and preserve the parent refractory lining.

It has been found that the magnesia and chrome ores in proper form and grain size when coated on a suitable parent refractory lining in the proper manner will bond directly to the surface of said parent refractory lining to result in a permanent bond being established which will under practically all conditions of operation remain on the face of said refractory lining unless the parent refractory lining is in a spalling condition prior to the application of said coating.

It can readily be seen that an entirely new concept in furnace repair technique has been conceived and presented herein and one that can go a long way towards reducing the cost of refractories per ton of steel produced and furthermore one which will be simple to apply and control, since it can be accomplished on a prescheduled basis to provide continuous furnace operation over much longer periods of time. It is even possible if desired to augment the disclosures contained herein by having recourse to the use of very high temperature refractory oxides to meet almost any problem that may arise in this field. A few of the higher temperature refractory materials which may be used are as follows:

| | ° F. |
|---|---|
| (1) Thorium | 5486 |
| (2) Berylium | 4685 |
| (3) Zirconium | 3632 to 5072 |
| (4) Dolomite | 3407 to 4505 |
| (5) Alumina | 3722 |

By applying successively coatings one over the other, either successively or simultaneously or in combination with the above cited refractory oxides, to the heated surface of the parent refractory lining of the furnace, each coating is immediately subjected to the full heat of the furnace, thus permitting the proper interaction to take place immediately between the sprayed refractory coatings and/or the parent refractory lining to occur in a step by step procedure. In this manner, the ingredients of the prime coating and/or the subsequent coatings are bonded and interacted one with the other and with the parent refractory lining and/or the iron, iron oxide and slag that may be contained on the face of the parent refractory lining, such action continuing for successive deposits of iron, iron oxide and slag that may be deposited thereon in subsequent heats. The intercrystalline reaction which takes place causes the prime coat and any number of subsequent or successively placed coatings to become a monolithic mass with the underlying parent refractory lining, the whole reaction taking place in a very short time and without unduly affecting the temperature of the lining or causing it to be injured in any manner, shape or form.

The coating or coatings therefore placed directly on the face of the existing parent refractory lining result in a new structure of compounds and spinels formed directly thereon under the heat of the furnace, and presents increased refractoriness and chemical resistance (with greater ability to absorb the iron, iron oxides and slags), higher temperature resistance, and greater length of life with each successive coating and will in addition withstand wide temperature differentials and thermal shocks and be highly resistant to spalling.

The normal use to which the instant invention may be put in spraying and repairing furnace linings may be spelled out as follows:

(1) Repair of worn, eroded or spalled spots or areas.

(2) Repairs as stated in (1) to be accomplished first, then the whole furnace area may be covered with successive coats as desired and deemed necessary to protect the lining and prolong its life.

(3) If so desired the whole or most vulnerable refractroy lining face area may be covered at the start of a campaign or directly thereafter to provide a suitable coating which will greatly prolong the overall lining life.

(4) If during a campaign it is necessary to close down a furnace and drop the temperature therein for any reason whatsoever for a prolonged period of time, the whole area may be covered while still hot with a suitable plurality of coatings to prevent moisture absorption on cooling, deterioration of the lining during down period, and spalling on reheating of the furnace.

It must be remembered that this invention as disclosed herein does not give all the possible variations which may occur to any one familiar with the art and the disclosures contained herein are simply illustrative of some of the ends that may be accomplished by their use.

This invention is intended to comprehend any types of compositions suitable for the particular purposes described. However, by way of example reference is made to the Murphy and Demaison Patent No. 2,809,126, dated October 8, 1957, which describes a chrome ore composition which would be suitable for a prime coating first applied, such a composition comprising the following ingredients:

(1) Chrome ore as the refractory material.

(2) Iron oxide (either present in or added to the chrome ore) as the fluxing agent.

(3) Colloidal clay as the suspension agent.

(4) Sodium silicate as the binding agent.

(5) Metal salts of amyl sulphonic acid as the dispersing agent or wetting agent.

All of these ingredients should be finely ground and thoroughly mixed in the proportions revealed in said patent.

Other suitable compositions possessing more refractory or heat resisting properties as well as chemical resistance could follow the formulae of the Murphy and Demaison patent cited above but with reduced amounts of the chrome ore and with equivalent amounts of dead burned magnesite substituted. Magnesite is more highly refractory than chrome ore and will continue to react with the subsequent coatings of iron oxide formed on the surface during subsequent furnace operation.

In other words the second or third coatings will comprise varying mixtures of chrome ore and dead burned magnesite as the refractory material, without having to change the amounts of the fluxing, suspension, binding and wetting agents or the compounds chosen, for such uses.

However, reference may also be made to pending applications (owned by the assignee of the instant application) which disclose specific types of refractory compositions capable of use as coatings to be superimposed upon the prime coating.

Serial No. 792,701, filed February 12, 1959
Serial No. 30,778, filed May 23, 1960

What is claimed is:

1. A method of prolonging the life of an open hearth furnace lining, which consists in spraying onto the flame exposed surface of said lining while the furnace is in full operation at least two high temperature refractory material coatings in superimposed relation, the first coating being compatible with the furnace lining and capable of reacting with the iron oxide and slag deposited on said lining to form spinels of higher refractoriness than the refractory material of the first coating, and the second coating being composed in part of a refractory material such as is present in the first coating and in part of another more refractory material, said second coating being compatible with the first coating and also capable of reacting with the iron oxide and slag deposited on the first coating to form spinels of higher refractoriness than the refractory materials of the second coating, the more refractory part of the second coating having a greater capacity than the other part of said coating to absorb and react with the iron oxides and slag as they are continually being deposited on said second coating during the normal furnace operation to form additional spinels of higher refractoriness than the refractory materials composing the second coating.

2. A method according to claim 1, wherein each coating contains a fluxing agent which is activated by the heat generated in the furnace during normal full operating conditions to produce a fusion bond with the surface of the hot furnace lining and with each preceding coating as the coatings are successively applied one upon another, and wherein the fluxing properties of the first coating are greater than those of the next succeeding coating, and wherein the coatings also contain binding, suspension and wetting agents to aid in preliminarily mixing, spraying and binding the solid particles to the hot furnace lining.

3. A method according to claim 1, wherein the refractory materials contained in the coatings are all of fine grain size and are intimately and thoroughly mixed with water to produce a sprayable slurry.

4. A method according to claim 1, wherein the refractory material of the first coating is a chrome ore composition.

5. A method according to claim 4, wherein the refractory material of the second coating is a chrome-magnesia composition in which the magnesia content does not exceed that of the chrome ore.

6. A method according to claim 4, wherein the refractory material of the second coating is a magnesia-chrome composition in which the magnesia content exceeds that of the chrome ore.

References Cited in the file of this patent

UNITED STATES PATENTS

| | | |
|---|---|---|
| 1,091,567 | Eldred | Mar. 31, 1914 |
| 2,124,865 | Windler et al. | July 26, 1938 |
| 2,330,129 | Lucas et al. | Sept. 21, 1943 |
| 2,809,126 | Murphy et al. | Oct. 8, 1957 |
| 2,968,083 | Lentz et al. | Jan. 17, 1961 |